Figures 1, 1A:
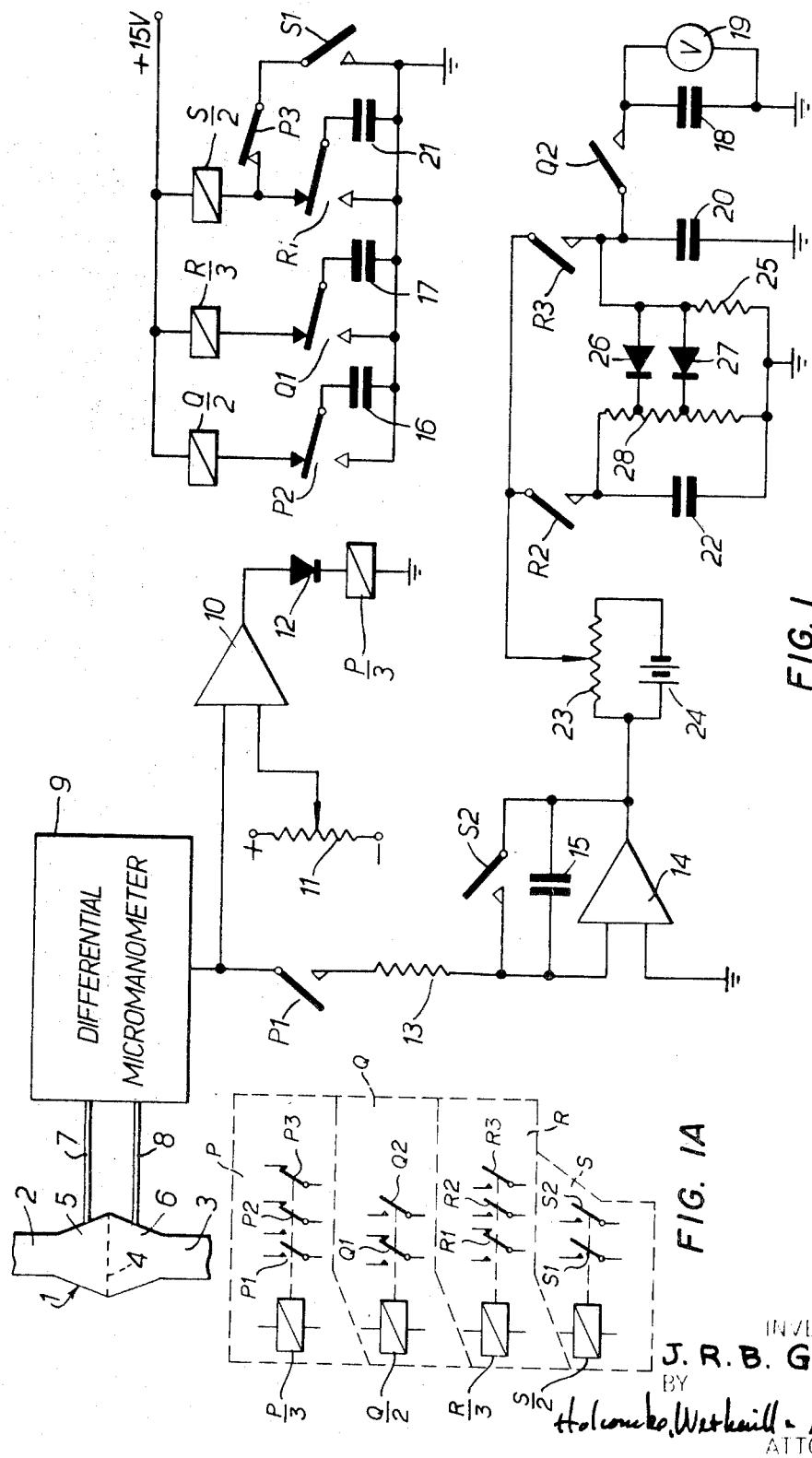

United States Patent

[11] 3,593,576

[72] Inventor James Robertson Bouvard Greer
 Newton Mearns, Glasgow, Scotland
[21] Appl. No. 743,164
[22] Filed July 8, 1968
[45] Patented July 20, 1971
[73] Assignee Mercury Electronics (Scotland) Limited
[32] Priority July 13, 1967
[33] Great Britain
[31] 32,212/67

[54] APPARATUS FOR THE MEASUREMENT OF FLUCTUATING FLUID FLOW
 11 Claims, 1 Drawing Fig.
[52] U.S. Cl. .................................................. 73/206, 235/151.34
[51] Int. Cl. .................................................. G01f 1/04
[50] Field of Search .......................................... 73/205, 206, 194; 128/2.08, 2.07; 235/183, 151.34, 151.32, 61

[56] References Cited
UNITED STATES PATENTS
2,919,578 1/1960 Sink ............................. 73/206
3,016,197 1/1962 Newbold ....................... 235/151.34

Primary Examiner—Richard C. Queisser
Assistant Examiner—Marvin Smollar
Attorney—Holcombe, Wetherill & Brisebois ABSTRACT: Apparatus for the measurement of fluctuating fluid flow includes a transducer developing an electric signal related to the pressure difference between opposite sides of a barrier in the path of the flow. Switch means responsive to the onset of flow in a selected direction applies the transducer signal to an integrator. When flow in the selected direction ceases a switch applies the integrator output voltage to charge a capacitor, which is continuously discharged at a constant rate. When flow recommences the voltage on the capacitor is applied to control an indicator, which thus provides an indication of average flow rate in the selected direction.

INVENTOR
J. R. B. GREER
BY
Holcombe, Wetherill & Brisebois
ATTORNEYS

APPARATUS FOR THE MEASUREMENT OF FLUCTUATING FLUID FLOW

DESCRIPTION OF THE INVENTION

This invention relates to improvements in flow-measuring apparatus and is particularly concerned with apparatus for the measurement of pulsatile airflow. The invention has particular though not exclusive application in the field of electrospirometry and will chiefly be described with reference to this application.

It is frequently useful to anaesthetists and physiologists to record the movement of air in and out of the lungs of a human (or animal) under observation. This may conveniently be carried out using a pneumotachograph, pressure transducer and electronic integrator but the use of the device to be described is not restricted to this form of electrospirometer.

When using an electrospirometer observations may readily be made of the size of individual breaths (tidal volume) and of the number of breaths in any minute (respiratory rate), but the factor of main interest to the observer is the product of these two (ventilation or minute volume) since the same gas exchange may be achieved by a small number of deep breaths or a larger number of shallow breaths.

Thus, in order for example to know rapidly whether the administration of a drug has resulted in a depression of ventilation, it would be useful to display continuously the breath-by-breath "instantaneous minute volume" by dividing the volume of each breath by the interval between it and its successor.

It is a primary object of the invention to provide fluid flow measuring means operable to provide an indication of the value of fluid flow in a selected direction in a conduit.

It is a further object of the invention to provide fluid flow measuring apparatus operable to provide an indication representing fluid flow in a selected direction divided by the time interval between successive flow.

It is another object of the invention to provide spirometer apparatus capable of accurately indicating the ventilation achieved by a subject's breathing.

It is an additional object of the invention to provide spirometric apparatus in which allowance in measuring the ventilation provided by a subject's breathing, allowance may be made for the spaces within the ventilated body not taking part in gas exchange.

The present invention may, in one embodiment comprise conduit means for a flowing fluid, said conduit being provided with a barrier offering resistance to the flow and having pressure-sensing connections on either side of the barrier. The pressure sensing connections are connected by pipes to respective inputs of a pressure difference transducer which thus yields an output signal representative of the rate of flow. First switch means responds to signals of a polarity representing flow in a selected direction to apply the transducer signals to an integrated flow over a period of time. When flow in the selected direction ceases, second switch means closes momentarily to apply the integrator output voltage to a capacitor which is connected to a device producing discharge thereof at a controlled rate. When flow in the selected direction is resumed, the voltage on the capacitor is applied to control and indicatory device, which thus yields an indication representative of the instantaneous respired volume divided by the time interval between respirations.

Further features and advantages of the invention will become apparent from the following description taken in conjunction with the drawing, which is a schematic diagram illustrating an exemplary embodiment of spirometric apparatus according to the invention. Those features which are believed to be novel are set forth with particularlity in the appended claims.

In the drawing, reference 1 denotes generally a pneumotachographic head, comprising channels 2 and 3 leading to a patient's breathing apparatus and to a gas source respectively. Channels 2 and 3 are conjoined at a gauze member 4, gas flow through which results in a pressure differential arising between spaces 5 and 6. These spaces are joined by way of tubes 7, 8 respectively to an electrical differential micromanometer 9, yielding an output signal varying in magnitude with the pressure differential across the gauze 4.

The output signal from micromanometer 9 is applied to the integrating means by way of switch means constituted in this case by a normally open relay contact P1 of a relay forming a part of direction-sensitive switch means.

The output signal from micromanometer 9 is also applied to a direction-sensitive circuit comprising an operational amplifier 10, the other input of which is returned to a bias potential selected by means of potentiometer 11 connected across a suitable bias supply. The output of amplifier 10 is applied by way of a diode 12 to the coil P/3 of relay P. The polarity of diode 12 and the bias voltage selected by potentiometer 11 are so chosen that the contact P1 of relay P is closed during inspiration, thus connecting the output of micromanometer 9 by way of a resistor 13 to one input of another operational amplifier 14 provided with a feedback capacitor 15, which has previously been discharged by the closing of a relay contact S2, as will later be described. The output signal from amplifier 14 thus represents the time integral of the input signal.

Immediately the patient's inspiration ceases, the contact P3 of relay P will open, thus disconnecting the input signal from amplifier 14.

Contact P2 of relay P actuates a first time-delay switch means, constituted in the present embodiment by a relay. Relay contact P2, which while the relay was operated provided a discharge path, specifically a short circuit, for a capacitor 16, now changes over to connect the capacitor in series with the operating coil Q/2 of relay Q across a 15-volt direct voltage supply represented only as a terminal +. Relay Q thus operates. Contact 1 changes over to provide a discharge path for a capacitor 17 and contact Q2 closes to connect a capacitor 18, the potential on which is continuously measured by a high input impedance voltmeter 19, in shunt with a capacitor 20, which has been charged as will be described below. The potential previously present on capacitor 18, which is of much lower capacitance, and is measured by voltmeter 19.

When capacitor 16 has charged through the operating coil Q/2 of relay Q, the current will drop and the relay will thus release to actuate a second time-delay switch means, here formed by a relay R. Contact Q2 will then disconnect measuring circuit 18, 19 from capacitor 20 and contact Q1 will change over to connect the operating coil R/3 of relay R in series with capacitor 17 across the 15-v. supply. Relay R will now operate and its contact R1 will change over to short circuit a capacitor 21 while contacts R2 and R3 will close to connect respective capacitors 22 and 20 to the output of operational amplifier 14, in series with a bias voltage obtained from a potentiometer 23 connected across a direct voltage source represented for the sake of convenience in illustration as a battery 24. Capacitors 22 and 20 are thus charged to the output voltage of amplifier 14, which represents the integrated inspired volume, less the bias voltage from potentiometer 23, which represents the dead space.

When capacitor 17 has charged sufficiently, the current through the operating coil R/3 of relay R falls and the relay releases to actuate a third time-delay switch means, here formed by a relay S. Contact R1 now changes over to connect capacitor 21 in series with the operating coil S/2 of relay S, which operates. Contact S1 completes a holding circuit for relay S via contact P3 while contact S2 short circuits the feedback capacitor 15 of integrating amplifier 14, thus preparing the integrator for further operation. Meanwhile contacts R2 and R3 have opened to disconnect the measuring circuit from the output of amplifier 14. The potential on capacitor 20 now falls because of the resistor and biased diode network connected in shunt with it. This network comprises a resistor 25 and two diodes 26, 27 which are differently biased from a voltage divider resistance 28 connected in parallel with capacitor 22. As capacitor 22 is charged at each operation of the circuit to the same potential as capacitor 20, the curve-shaping diodes 26, 27, which ensure that the potential upon capacitor 20 falls reciprocally with time, are always biased to a desired proportion of the initial voltage on capacitor 20 thus ensuring that the potential upon this latter capacitor is proportional to the reciprocal of the time elapsed since contact R3 opened.

When inspiration again commences, relay P will again operate, causing contact P3 to break the holding circuit for relay S, so that the short circuit on the feedback capacitor is removed at the same time as the micromanometer output signal is again applied to integrating amplifier 14 by way of contact P1.

Once the potential on capacitor 20 has been sampled it is again charged to the potential which appears on measuring capacitor 20 during the next inspiration. The cycle thus repeats, the potential on capacitor 18 being always proportional to the tidal volume of gas flow divided by the time which has elapsed between successive breaths.

The apparatus described in relation to the drawing may be modified by the provision of a changeover switch operable to cause capacitor 20 to be charged at each inspiration to a constant voltage. The indication will then be proportional to the instantaneous respiration rate, rather than to the instantaneous minute volume as in the arrangement shown.

It will be understood that where electromagnetic relays are used to provide the desired switching sequence in the apparatus described in relation to the drawing it is equally possible to employ equivalent semiconductor switching devices. The necessary circuit modifications will be obvious to those skilled in the art.

It will be apparent that the apparatus described may readily be modified, chiefly by alteration of the measuring head 1, to allow it to be used for the measurement of mean flow rates of other intermittently flowing fluids. It may be applied for example to the measurement of the consumption of intermittently injected fuels.

It will also be apparent that the choice of time constants will depend upon the particular application of the apparatus and that the arrangement shown illustrates only the principles to be followed in constructing the apparatus. The specific circuits employed to perform the indicated functions may be varied at the desire of the constructor and are all within the capabilites of those skilled in the art.

I claim:

1. Apparatus for the measurement of intermittent fluctuating fluid flow in a predetermined direction, comprising in combination:
   conduit means for said flowing fluid;
   barrier means in said conduit offering resistance to said flow whereby a pressure differential appears across said barrier;
   pressure difference transducer means having first and second pressure inputs connected to said conduit on opposite sides of said barrier and a voltage output, said transducer developing at said voltage output signals which are related in polarity and magnitude to the direction and value of a pressure difference between said inputs;
   signal-integrating means having an input and an output at which said integrating means delivers a voltage proportional to the time integral of a signal applied to its input;
   first switch means operable to connect signals from said transducer output to said integrator means;
   first actuator means responsive to transducer signals of one polarity to actuate said first switch means;
   indicator means having an input and being responsive to a voltage applied to said indicator input to provide an indication proportional to said voltage;
   first capacitor means;
   second switch means for connecting said first capacitor means to said indicator means input;
   third switch means for connecting said first capacitor means to receive said integrator output voltage;
   discharge means connected to discharge said first capacitor means at a rate inversely proportional to time;
   second actuator means responsive to cessation of said transducer signal of said one polarity to momentarily actuate said second switch means; and
   third actuator means operative upon deactuation of said second switch means to momentarily actuate said third switch means; whereby said indicator means provides an indication of the average rate of fluid flow in the direction represented by signals of said one polarity.

2. The apparatus claimed in claim 1 wherein said first switch means comprises the combination of:
   operational amplifier means having two signal inputs and one signal output, said amplifier means operating to develop at said output an output voltage corresponding to the difference between the voltages applied to said two signal inputs;
   circuit means connecting said transducer output signals to one said amplifier input;
   a source of bias potential connected to the other said amplifier input;
   electrically operable relay means including a contact closed on actuation thereof;
   circuit means including a diode connecting said amplifier output to said relay means thereby to produce actuation thereof in response to transducer output signals of said one polarity;
   and circuit means including said relay contact means connecting said transducer output signals to said integrating means input.

3. The apparatus claimed in claim 1 wherein said integrating means comprises:
   operational amplifier means having two signal inputs and one signal output, said amplifier means operating to develop at said output an output voltage corresponding to the difference between the voltages applied to said two signal inputs;
   second capacitor means connected between said output and a first of said inputs;
   a connection from the other of said inputs to a point of constant potential;
   and circuit means including a resistor connecting said transducer output to said first input.

4. The apparatus claimed in claim 1 wherein said discharge means comprises:
   additional switch means actuated simultaneously with said third switch means to connect further capacitor means in shunt with said first capacitor means to said integrator means output;
   tapped voltage divider means connected in shunt with said further capacitor means;
   and diode means connecting said voltage divider tap to said first capacitor means.

5. The apparatus claimed in claim 3 and further including:
   circuit means including fourth switch means for short circuiting said second capacitor means;
   fourth actuator means responsive to deactuation of said third switch means to produce actuation of said fourth switch means;
   additional switch means and circuit means including said additional switch means actuated by said first actuator means simultaneously with said first switch means causing deactuation of said fourth switch means.

6. The apparatus claimed in claim 5 wherein said third switch means connecting said integrator output to said first capacitor means includes an adjustable constant voltage source.

7. The apparatus claimed in claim 5 wherein each of said second, third and fourth switch means and actuator means comprises:
   a current source having first and second terminals;

a respective relay means having an operating coil and normally open contact means, said contact means constituting said respective switch means;

changeover contact means actuated by the preceding one of said actuator means;

circuit means connecting said first terminal of said current source to a normally open contact of said changeover contact means and to a pole of a further capacitor means;

circuit means connecting the other pole of said further capacitor means to the moving contact of said changeover contact means;

and circuit means connecting said operating coil between the normally closed contact of said changeover contact means and said second terminal of said current source, thereby to produce on actuation of said changeover contact means momentary energization of said relay-actuating coil as said capacitor charges from said source by way of said coil.

8. The apparatus claimed in claim 7 wherein said fourth relay means additionally has normally open contact means operable to discharge said second capacitor means.

9. The apparatus claimed in claim 8 wherein said fourth relay means additionally has further normally open contact means, and wherein circuit means including said further normally open contact means of said fourth relay means and including normally closed contact means actuated by said first actuator means additionally connects said fourth relay-operating coil to said first terminal of said current source, whereby said second capacitor means remains short circuited until a signal of said predetermined polarity is again produced by said transducer.

10. The apparatus claimed in claim 2 wherein said source of bias potential includes a voltage source; a potentiometer shunting said voltage source and a connection from the tapping of said potentiometer to said other input of said amplifier.

11. Apparatus for the measurement of fluid flow in a predetermined direction, comprising in combination:

conduit means for said flowing flow;

barrier means in said conduit offering resistance to said flow whereby a pressure differential appears across said barrier;

pressure difference transducer means responsive to said pressure differential, said transducer developing output signals representative in polarity and magnitude of the direction and value of said pressure differential;

integrating means adapted to charge a capacitor to a potential representative of the time integral of an applied signal;

polarity-sensitive switch means responsive to output signals of a predetermined polarity from said transducer to transmit said output signals to said integrating means during fluid flow in a predetermined direction;

discharge means operative in the absence of transducer signals of said predetermined polarity to cause the potential on said capacitor to fall as a reciprocal function of time;

indicator means adapted to provide a continuing indication of a briefly applied potential; and indicator switch means responsive to cessation of signals of said predetermined polarity to transmit the potential on said capacitor to said indicator means.